(No Model.)

G. S. AGEE.
SHOVEL PLOW.

No. 253,331.  Patented Feb. 7, 1882.

WITNESSES:
Chas. Nida
C. Sedgwick

INVENTOR:
G. S. Agee
BY Munn & Co
ATTORNEYS.

N. PETERS, Photo-Lithographer, Washington, D. C.

UNITED STATES PATENT OFFICE.

GEORGE S. AGEE, OF MINT HILL, MISSOURI.

SHOVEL-PLOW.

SPECIFICATION forming part of Letters Patent No. 253,331, dated February 7, 1882.

Application filed September 24, 1881. (No model.)

*To all whom it may concern:*

Be it known that I, GEORGE S. AGEE, of Mint Hill, in the county of Osage and State of Missouri, have invented a new and useful Improvement in Shovel-Plows, of which the following is a full, clear, and exact specification.

Reference is to be had to the accompanying drawings, forming part of this specification, in which similar letters of reference indicate corresponding parts in all the figures.

Figure 1:
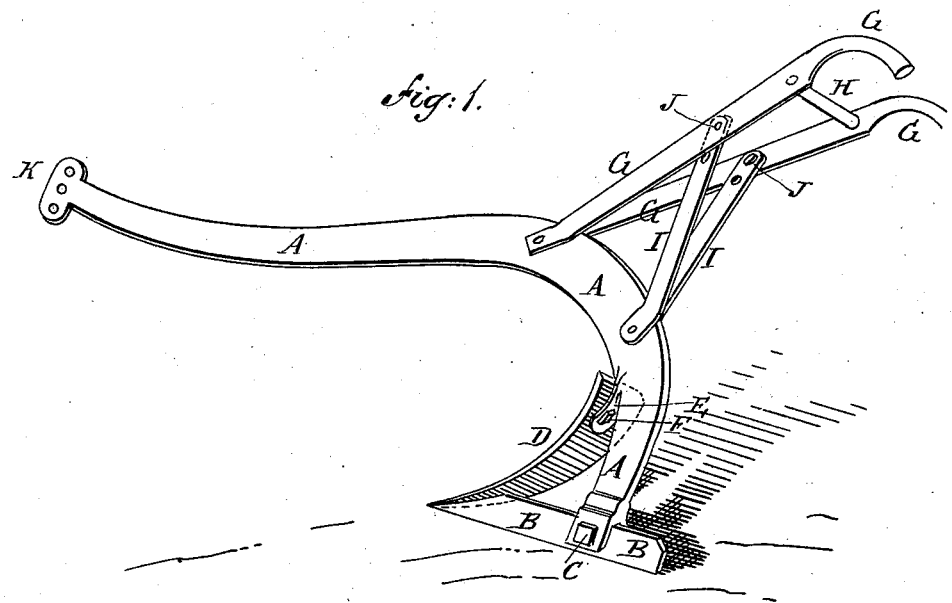
Figure 2:
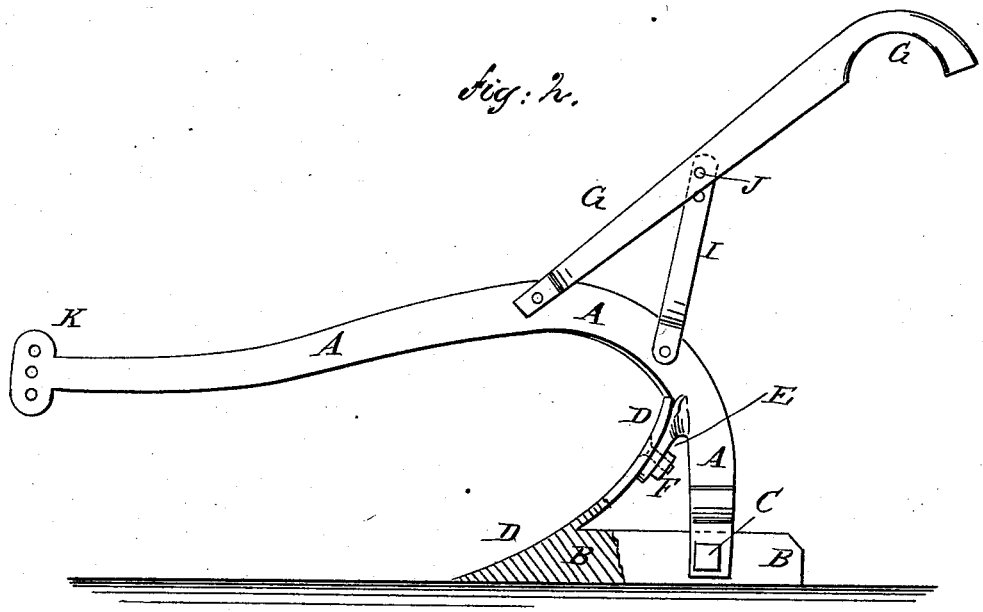

Figure 1 is a perspective view of my improvement. Fig. 2 is a side elevation of the same, partly in section.

The object of this invention is to produce shovel-plows more effective and uniform in operation and more easily controlled than shovel-plows constructed in the ordinary manner.

The invention consists in a curved iron beam having a slotted lower end and inclined lug, and also in the combination, with the curved beam having its lower end slotted and provided with an inclined lug, of the shovel secured at its upper part to the said lug and welded along the center line to the beveled forward end of the bar or foot, which is secured in the slotted end of the beam, all as hereinafter fully described.

A is the iron beam, the rear part of which is curved downward to receive the plow, and is thus similar to a turn-plow beam, but lighter. The lower end of the beam A is slotted to receive the bar or foot B, which is secured in place by a bolt, C, passing through it and through the slotted lower end of the said beam. The forward end of the bar B is beveled upon the upper side, and is welded to the lower end of the shovel D along the central line of the said shovel. The shovel D tapers gradually to a point, so that it will enter the ground readily, and so that weeds and other rubbish will not lodge upon the lower part of the said shovel. The middle part of the upper end of the shovel rests upon the lower part of an inclined lug or arm, E, and is secured to the said arm by a bolt, F. The upper end of the arm E is welded, bolted, or riveted to the plow-beam A, so as to afford a firm support to the plow D.

G are the handles, the forward ends of which are bolted to the opposite sides of the beam A. The upper parts of the handles G are connected and held in proper relative position by a round, H.

To the opposite sides of the beam A, at a little distance in the rear of the forward ends of the handles G, are secured by bolts or rivets the lower ends of the braces I, the upper ends of which are secured to the handles G by bolts or screws J. Several holes are formed in the upper ends of the braces I to receive the screws or bolts J, so that the handles G can be raised and lowered as the height of the plowman may require.

Upon the forward end of the plow-beam A is formed a vertical cross-head, K, in which are formed a number of holes to receive a draft-clevis, so that the point of draft attachment can be raised and lowered to cause the plow to work deeper or shallower in the ground, as may be required.

With this construction the plow will run steadily in the ground, will work at a uniform depth, and can be readily guided and controlled.

This improvement is applicable to plows having one, two, or more shovels.

I am aware that curved iron beams are old. I am also aware that beams having slotted lower ends are old, and I am further aware that a standard has been provided with a lug on its forward edge, to which lug the upper part of the shovel is secured, the lower part of the said shovel being welded along its center to the bar or foot, and I therefore do not claim such; but What I do claim, and desire to secure by Letters Patent, is—

1. In a shovel-plow, the curved plow-beam A, formed, as described, with a slotted lower end and with the inclined lug E, substantially as and for the purpose set forth.

2. In a shovel-plow, the combination, with the beam A, having its lower end slotted and provided with the inclined lug E, of the shovel D, secured at its upper part to the said lug and welded along the center line to the beveled forward end of the bar B, secured in the slotted end of the beam, substantially as and for the purpose set forth.

GEORGE SPARREL AGEE.

Witnesses:
JOHN S. HAYS,
A. J. CHILDERS.